United States Patent
Eisch et al.

(10) Patent No.: US 11,097,450 B2
(45) Date of Patent: Aug. 24, 2021

(54) CORE SYSTEM, USE OF THE CORE SYSTEM IN THE PRODUCTION OF A FIBER COMPOSITE COMPONENT AND METHOD FOR PRODUCING A FIBER COMPOSITE COMPONENT

(71) Applicant: Bayerische Motoren Werke Aktiengesellschaft, Munich (DE)

(72) Inventors: Christoph Eisch, Munich (DE); Florian Spirkl, Bodenkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 422 days.

(21) Appl. No.: 15/962,888

(22) Filed: Apr. 25, 2018

(65) Prior Publication Data
US 2018/0236694 A1     Aug. 23, 2018

Related U.S. Application Data

(63) Continuation of application No. PCT/EP2016/069369, filed on Aug. 16, 2016.

(30) Foreign Application Priority Data

Oct. 29, 2015   (DE) .................... 10 2015 221 182.7

(51) Int. Cl.
*B29C 33/02*    (2006.01)
*B29C 33/48*    (2006.01)
(Continued)

(52) U.S. Cl.
CPC ............ *B29C 33/485* (2013.01); *B29C 33/02* (2013.01); *B29C 33/444* (2013.01); *B29C 53/584* (2013.01); *B29C 53/824* (2013.01); *B29C 53/564* (2013.01); *B29C 70/32* (2013.01); *B29C 70/48* (2013.01)

(58) Field of Classification Search
CPC ....... B29C 70/48; B29C 53/824; B29C 70/34; B29C 70/347; B29C 33/76
See application file for complete search history.

(56) References Cited

U.S. PATENT DOCUMENTS

| 4,541,605 A | 9/1985 | Kubota et al. |
| 4,591,400 A | 5/1986 | Fradenburgh et al. |

(Continued)

FOREIGN PATENT DOCUMENTS

| DE | 31 25 813 A1 | 1/1983 |
| DE | 35 16 420 A1 | 11/1985 |

(Continued)

OTHER PUBLICATIONS

EP0206268 Minor Translation (Year: 1986).*

(Continued)

*Primary Examiner* — Jacob T Minskey
*Assistant Examiner* — Adrien J Bernard
(74) *Attorney, Agent, or Firm* — Crowell & Moring LLP

(57) ABSTRACT

A core system for the production of a fiber composite component includes at least two core elements which are coupled to one another and are displaceable relative to one another. At least one core element has a surface which is oblique to a displacement direction. A method for producing the fiber composite component uses the core system.

13 Claims, 1 Drawing Sheet

(51) Int. Cl.
    *B29C 53/58*    (2006.01)
    *B29C 53/82*    (2006.01)
    *B29C 33/44*    (2006.01)
    *B29C 70/32*    (2006.01)
    *B29C 70/48*    (2006.01)
    *B29C 53/56*    (2006.01)

(56) References Cited

U.S. PATENT DOCUMENTS

| | | |
|---|---|---|
| 6,638,466 B1 | 10/2003 | Abbott |
| 6,890,470 B2 | 5/2005 | Staub et al. |
| 9,144,949 B2 | 9/2015 | Ender |
| 2013/0181374 A1 | 7/2013 | Ender |
| 2014/0182232 A1* | 7/2014 | Holt ........................ H02S 20/00 52/645 |
| 2015/0224693 A1 | 8/2015 | Jaussaud et al. |

FOREIGN PATENT DOCUMENTS

| | | |
|---|---|---|
| DE | 39 11 312 C1 | 4/1990 |
| DE | 42 34 002 A1 | 4/1994 |
| DE | 100 44 626 A1 | 3/2002 |
| DE | 102 10 517 B3 | 1/2004 |
| DE | 10 2008 013 759 A1 | 9/2009 |
| DE | 10 2012 000 564 A1 | 7/2013 |
| DE | 10 2012 106 871 B4 | 11/2014 |
| EP | 0 206 268 A2 | 12/1986 |

OTHER PUBLICATIONS

DE10044626 Wolf Translation (Year: 2002).*
Fiber Composite Material, Sep. 25, 2015, Wikipedia, (https://web.archive.org/web/20150925021925/https://de.wikipedia.org/wiki/Faserverbundwerkstoff) (Year: 2015).*
PCT/EP2016/069369, International Search Report dated Apr. 19, 2017 (Three (3) pages).
German Search Report issued in German counterpart application No. 10 2015 221 182.7 dated Jun. 7, 2016, with Statement of Relevancy (Ten (10) pages).
"Faserverbundwerkstoff—Wikipedia", Sep. 25, 2015, 12 total pages with partial English translation, XP055325087, URL: https://web.archive.org/web/20150925021925/https://de.wikipedia.org/wiki/Faserverbundwerkstoff.
Chinese Office Action issued in Chinese counterpart application No. 201680041989.8 dated Apr. 4, 2019 (Ten (10) pages).

\* cited by examiner

CORE SYSTEM, USE OF THE CORE SYSTEM IN THE PRODUCTION OF A FIBER COMPOSITE COMPONENT AND METHOD FOR PRODUCING A FIBER COMPOSITE COMPONENT

CROSS REFERENCE TO RELATED APPLICATIONS

This application is a continuation of PCT International Application No. PCT/EP2016/069369, filed Aug. 16, 2016, which claims priority under 35 U.S.C. § 119 from German Patent Application No. 10 2015 221 182.7, filed Oct. 29, 2015, the entire disclosures of which are herein expressly incorporated by reference.

BACKGROUND AND SUMMARY OF THE INVENTION

The invention relates to a core system for the production of a fiber composite component, to the use of the core system as a core, and to a method for producing a fiber composite component.

Fiber composite components by virtue of their high stability at low weights are increasingly used the example in the automotive industry. The fiber composite components can be produced in various ways. Pressing methods are one type of method. The known pressing methods comprise inter alia a so-called injection-pressing method in which a matrix-forming material of the fiber composite component, also referred to as the molding mass, is injected into a cavity of a tool and is cured therein under pressure and heat.

Braided CRP hollow sections are inter alia produced by injection pressing which is also referred to as "resin transfer molding" (RTM), Herein, a braided core which is subsequently surrounded by matrix-forming material is first placed into the tool, in particular into the cavity of the tool. The braided core is previously produced in that a core is circumferentially braided with fibers which subsequently form part of the braided CRP hollow section. The core has to be removed after the fiber composite component has been produced.

The removal of the core in the prior art is enabled in that at least one demolding ramp by way of which the core can be removed from the fiber composite component produced is provided on the core. However, by virtue of the demolding ramp it is not possible for fiber composite parts which are configured symmetrically with consistent faces or a consistent cross-section to be produced, since the demolding ramp results in at least one face of the fiber composite component produced to be chamfered.

It is alternatively known from the prior art for an expanding core which is made from a flexible material to be used. In order for the braided cord to be produced, the core is expanded and is again vented after the production of the fiber composite component such that the expandable core returns to the initial position thereof and can be removed in a simple manner from the fiber composite component. However, in the ease of flexible expanding cores it has proven disadvantageous that the flexible expanding cores cannot offer sufficient resistance to the pressure that arises in injection pressing, on account of which the fiber composite components produced have a non-uniform wall thickness.

It is the object of the invention to provide a core system for producing a fiber composite component, by way of which it is possible for components having a uniform wall thickness and/or a consistent cross-section to be able to be produced in a simple manner.

The object is achieved according to the invention by a core system for the production of a fiber composite component, having at least two core elements which are coupled to one another and are displaceable relative to one another, wherein at least one core element has a face that is oblique to the displacement direction.

The core system described above can be used in particular as the core in the production of the fiber composite component.

The object is furthermore achieved by a method in which a core system of the aforementioned type is used. Herein, a core element is displaced in relation to another core element in a displacement direction. The core system is subsequently circumferentially braided with fibers. The braided core system is thereafter surrounded with a matrix-forming material of the fiber composite component. The matrix-forming material is subsequently cured. The core system is finally removed.

The fundamental concept of the invention lies in that the circumference or the dimensions, respectively, of the core system is/are adjustable in that the at least one core element which has a face that is oblique to the displacement direction is displaced. The core element that is moved along the displacement direction preferably has the oblique face by way of which the core element is displaced, on account of which a corresponding modification of the circumference or of the dimensions, respectively, of the entire core system results. For example, on account thereof it is possible for the core to be removed in a simple manner after the production of the fiber composite component in that the circumference of the core system is decreased. Depending on the arrangement of the oblique face, it is ensured that the component that is produced by way of the core system has a consistent wall thickness and/or a consistent cross-section.

Furthermore, the wall thickness of the fiber composite components produced can be set by way of the core system or by way of the core, respectively, in particular by way of the set dimensions. Moreover, the fiber content by volume of the fiber composite component produced can be set by way of the variable core system.

The core system is furthermore reusable since the core system can be removed in a non-destructive manner from the fiber composite component produced.

One aspect of the invention provides that at least one core element has a substantially decreasing cross-section. For example, the core element is configured so as to be wedge-shaped, on account of which the core element automatically has a face that is oblique to the displacement direction.

According to a further aspect of the invention, a main core element which has a substantially rectangular cross-section is provided. This main core element can serve as a bearing element for further core elements which have a face that is oblique to the displacement direction. By way of the plurality of core elements having an oblique face it is possible for a core system which has a substantially rectangular cross-section to be configured, the cross-sectional area of the core system being variable by way of the displacement of the core elements.

In as far as a plurality of core elements which have an oblique face are provided, the core elements can be displaced relative to the main core element and/or relative to one another along the displacement direction.

Furthermore, the core elements have in each case at least one external face which is part of the shell face of the entire core system and at least one contact face by way of which the core elements bear on one another. Accordingly, the main core element can likewise have an external face which is part of the entire shell face.

Alternatively, it can be provided that the main core element has only contact faces on which the core elements bear and by way of which the shell face of the entire core system is adjustable, in particular the circumference or the dimensions of the latter, respectively.

The contact face and the external face of at least one core element can run in a mutually oblique manner. A core element which has a face that is oblique to the displacement direction is configured in a simple manner on account thereof. The external face herein can be configured so as to be parallel with the displacement direction. This core element is configured so as to be wedge-shaped, for example.

A further aspect of the invention provides that the core elements are configured from a mechanically stable material, in particular from a metal. It is ensured on account thereof that the core elements withstand the high pressure in injection pressing during the production of the fiber composite component. Moreover, the core elements can be used for heating in as far as the core elements are made from a thermally conducting and/or electrically conductive material.

It can furthermore be provided that the core elements prior to the removal of the core system are displaced in relation to one another. On account thereof, it is possible for the diameter of the entire core system to be decreased before the core system is removed from the fiber composite component produced, on account of which the removal is facilitated.

According to a further aspect of the invention, the core elements during the incorporation of a matrix-forming material and/or during curing of the matrix-forming material are displaced in relation to one another. On account thereof, the circumference of the entire core system can be increased in order, for example, to influence the wall thickness and/or the fiber content by volume during the production of the fiber composite component. For example, a post-compression of the braided structure can be performed during the RTM process.

A further aspect of the invention provides that at least one core element is heated. On account thereof, the fiber composite component to be produced can be heated from the inside during the production thereof, on account of which the fiber composite component cures more rapidly. The core element can be configured so as to be thermally conductive and/or self-heating. For example, heating can be implemented by way of at least one bore in at least one core element, a warm fluid, for example water, flowing through the bore.

Other objects, advantages and novel features of the present invention will become apparent from the following detailed description of one or more preferred embodiments when considered in conjunction with the accompanying drawings.

Further advantages and properties of the invention are derived from the following description and from the drawings to which reference is made.

DETAILED DESCRIPTION OF THE DRAWINGS

Figure 1:
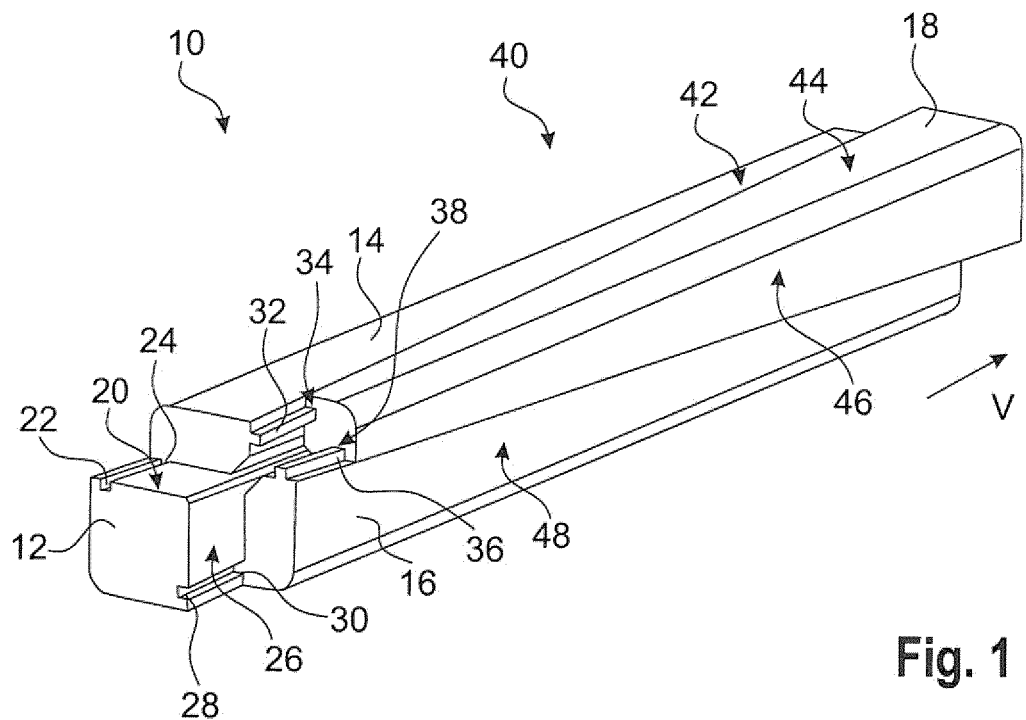
FIG. 1 shows a core system according to the invention in a first position.

A core system 10 for the production of a fiber composite component is shown in FIG. 1. The core system 10 in the embodiment shown has four core elements 12, 14, 16, 18 which are displaceable relative to one another.

The first core element 12 can also be referred to as the main core element. The second core element 14 and the third core element 16 are in each case disposed so as to be displaceable in relation to the main core element 12.

To this end, the main core element 12 has a contact face 20 having a groove 22 provided thereon, a corresponding protrusion 24 of the second core element 14 engaging in the groove 22 such that the second core element 14 can be displaced in a guided manner along a displacement direction V.

The main core element 12 furthermore has a second contact face 26 on which a second groove 28 is configured, in which second groove 28 a protrusion 30 of the third core element 16 engages. The third core element 16 can likewise be displaced in a guided manner along the displacement direction V in relation to the main core element 12.

Accordingly, the second core element 14 and the third core element 16 by way of the contact faces thereof bear on the respective contact faces 20, 26 of the main core element 12.

Moreover, the second core element 14 in the embodiment shown has a third protrusion 32 which engages in a groove 34 which is configured on a contact face of the fourth core element 18.

The third contact element 16 has a fourth protrusion 36 which engages in a groove 38 which is likewise configured in the fourth core element 18.

On account thereof, it is possible for the fourth core element 18 to be able to be displaced along the displacement direction V relative to the second and to the third core elements 14, 16. The core element 18 herein is guided by way of the grooves 34, 38 and by way of the protrusions 32, 36 that are provided on the core elements 14, 16.

The four core elements 12 to 18 by way of, in each case, two contact faces thus already bear on a neighboring core element 12 to 18, wherein the core elements 12 to 18 in each case have external faces which are part of a shell face 40 of the entire core system 10.

Of the external faces that form the shell face 40, only the external faces 42 of the second core element 14, the external faces 44 and 46 of the forth core element 18, and the external face 48 of the third core element 16 can be seen in FIG. 1. Accordingly, further external faces are on the opposite sides.

The core elements 14 to 18 furthermore have at least one face which is oblique in relation to the displacement direction V.

In the embodiment shown, these herein are the respective contact faces between the second core element 14 and the fourth core element 18, and the contact faces between the third core element 16 and the fourth core element 18. These contact faces of the core elements 14 to 18 moreover run obliquely in relation to the respective external faces of the core elements 14 to 18 that run parallel with the displacement direction V.

The circumference or the dimensions, respectively, of the entire core system 10 can be modified by virtue of the obliquely running faces, that is to say of the contact faces. To this end, the core elements 14 to 18 are displaced in relation to the main core element 12 or relative to one another along the displacement direction V or counter to the displacement direction V.

Figure 2:
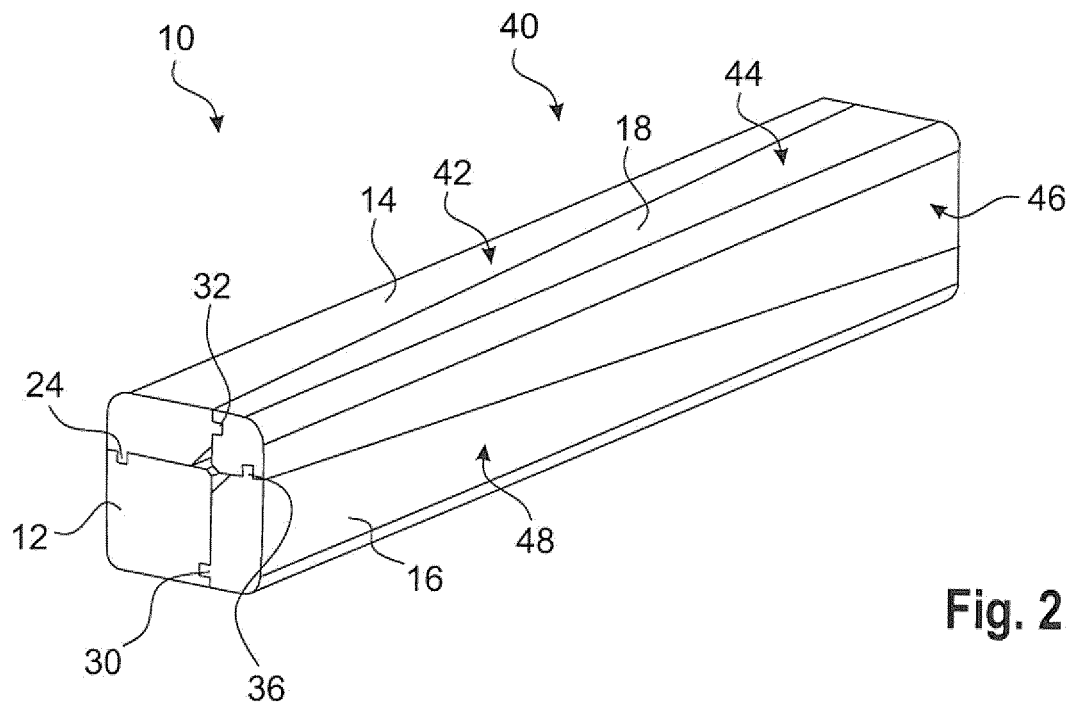
FIG. 2 shows the core system according to the invention from FIG. 1 in a second position.

This can be derived inter alia from a comparison of FIGS. 1 and 2, since the core elements 14 to 18 in FIG. 2 are shown in the terminal position thereof in which the circumference of the core system 10 is at a maximum.

The main core element 12 in the embodiment shown has a substantially rectangular cross-section, whereas the further core elements 14 to 18 have a substantially decreasing cross-section. This means that the cross-section of the core elements 14 to 18 is smaller at a first end than at an end that is opposite the first end. This can be particularly readily seen on the fourth core element 18 in FIG. 1.

The core elements 14 to 18 can be configured so as to be substantially wedge-shaped.

The second and the third core elements 14, 16 in the embodiment shown are configured so as to be mirror-inverted, configuring a contiguous functional group of the core system 10, since the core elements 14, 16 are displaced, jointly in relation to the main core element 12. This can also be derived from FIG. 1, since the second and the third core elements 14, 16 are displaced by the same distance relative to the main core element 12.

By contrast, the fourth core element 18 in the embodiment shown is displaced by double the distance, that is to say twice as far as the second and the third core elements 14, 16.

In general, the gearing, that is to say the ratio of the adjustment path of the fourth core element 18 as compared to the distances of the second and of the third core elements 14, 16, depends on the angle of the oblique faces of the latter in relation to the displacement direction V.

Since all the external faces of the core elements 12 to 18 run parallel with the displacement direction V, a substantially rectangular cross-section of the core system 10 results, wherein the shell face 40 is continuous, that is to say without steps. The precise cross-sectional area of the core system 10 is adjustable in that the core elements 12 to 18 are displaced in relation to one another since the core elements 14 to 18 in each case bear on one another by way of oblique faces, that is to say by way of contact faces thereof that are configured so as to be oblique. The continuously configured shell face 40 herein at least in the operating region is not modified, as can be derived from a comparison between FIGS. 1 and 2.

The core elements 12 to 18 are preferably configured from a hard material, in particular from a metal. It is guaranteed by virtue of the hard material that the core elements 12 to 18 can withstand the pressures that arise during the production method.

Accordingly, the core elements 12 to 18 are moreover thermally conducting such that the core elements 12 to 18 can serve for heating the fiber composite component during the production. To this end, the core elements 12 to 18 can be connected to a heat source, for example to a heat transmission liquid which is directed through the core elements such that the heat that is released to the core elements is transmitted onward by the core elements 12 to 18.

Alternatively or additionally, the core elements 12 to 18 can themselves be provided with a heat source. To this end, heating wires which are actuated by a controller of a tool are provided in the core elements 12 to 18, for example.

The production method of the fiber composite component which can established in a simple manner with the aid of the core system 10 as described above will be described hereunder.

The core system 10 in a so-called braided position, in which the circumference of the core system 10, or the dimensions of the latter, respectively, are initially decreased in comparison to the terminal position shown in FIG. 2, is illustrated in FIG. 1. The braided position can be considered to be an operating position of the core system 10. The core system 10 in this braided position shown in FIG. 1 is circumferentially braided with the fibers which are intended to become part of the fiber composite component.

Glass fibers, carbon fibers, ceramic fibers, aramid fibers, natural fibers, nylon fibers, or other fibers can be used herein.

The circumferentially braided core system 10 is subsequently placed into a tool in which the braided fibers are impregnated or soaked, respectively, with a matrix-forming material. The matrix-forming material can be a plastics material, for example a thermosetting plastic, an elastomer, or a thermoplastic material.

In an RTM injection-pressing method the matrix-forming material is injected under high pressure into a cavity of the tool. The circumferentially braided core system 10 has been previously placed into the cavity.

Once the braided fibers have been impregnated or soaked, respectively, with the matrix-forming material, the matrix-forming material is cured, on account of which the fiber composite component is produced.

In as far as at least one of the core elements 12 to 18 is configured so as to be heatable and/or thermally conducting, the curing of the matrix-forming material can be accelerated.

The core system 10 is subsequently removed from the fiber composite component produced. The core system 10 can subsequently be reused for the production of another fiber composite component. To this end it is important that the core system 10 can be removed from the fiber composite component produced in a simple and non-destructive manner.

The variable core system 10 prior to the removal from the braided position which represents an operating position can be displaced to a removal position in which the circumference of the core system 10 is further decreased such that the core system 10 is easier to remove. To this end, the core elements 14 to 18 are displaced in relation to the main core element 12 and/or in relation to one another in the displacement direction V.

It can furthermore be provided that the core system 10 during the curing of the matrix-forming material, or during the incorporation of the latter into the cavity of the tool, respectively, is displaced counter to the displacement direction V, on account of which the circumference of the core system 10 is increased. On account thereof, the fiber content by volume can be modified during the RIM process, which corresponds to a post-compression of the braided structure that is formed about the core system 10. Accordingly, the core system 10 is expanded such that the fibers can be post-compressed. This position can also be considered to be an operating position which is assumed by the core system 10 prior to the removal.

In general, the variability of the core system 10 enables the wall thickness and the fiber content by volume of the fiber composite component to be produced to be set by way of the core system 10 even during the production.

Since the core elements 12 to 18 are configured from a hard material, for example from a metal, it is moreover ensured that a high reproducibility as well as tight tolerances in terms of the wall thickness of the fiber composite component can be achieved.

By virtue of the core system 10 it is furthermore possible for symmetrical fiber composite components to be produced, the wall thickness of the symmetrical fiber composite components being consistent across the length of the wall.

In general, a core system 10 by way of which a fiber composite component which has a symmetrical shape and a uniform wall thickness can be produced in a simple manner is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A core system for the production of a fiber composite component, comprising:
   a plurality of core elements which are coupled to one another and are displaceable relative to one another, wherein a first core element of the plurality of core elements is a main core element which has a substantially rectangular cross-section, wherein a second core element of the plurality of core elements has an internal face that is oblique to a displacement direction and an external face that is not oblique to the displacement direction and that is a part of a rectangular shell face of the core system, wherein the second core element has a substantially decreasing cross-section such that a first cross-section at a first longitudinal end of the second core element is smaller than a second cross-section at a second longitudinal end of the second core element and is wedge-shaped, and wherein the core system has a rectangular cross-section.

2. The core system as claimed in claim 1, wherein the plurality of core elements each have at least one external face which is part of the rectangular shell face of the core system and at least one contact face via which the plurality of core elements bear on one another.

3. The core system as claimed in claim 2, wherein the at least one contact face and the at least one external face of at least one core element of the plurality of core elements run in a mutually oblique manner.

4. The core system as claimed in claim 1, wherein the plurality of core elements are configured from a hard material.

5. The core system as claimed in claim 4, wherein the hard material is a metal.

6. A use of the core system as claimed in claim 1 as a core in a production of a fiber composite component.

7. A method for producing a fiber composite component, comprising the acts of:
   a) displacing a first core element of a plurality of core elements of a core system in relation to a second core element of the plurality of core elements along a displacement direction wherein the second core element is a main core element which has a substantially rectangular cross-section, wherein the first core element has an internal face that is oblique to the displacement direction and an external face that is not oblique to the displacement direction and that is a part of a rectangular shell face of the core system, has a substantially decreasing cross-section such that a first cross-section at a first longitudinal end of the first core element is smaller than a second cross-section at a second longitudinal end of the first core element, and is wedge-shaped and wherein the core system has a rectangular cross-section;
   b) circumferentially braiding the core system with fibers;
   c) incorporating a matrix-forming material in the braided fibers;
   d) curing the matrix-forming material to produce the fiber composite component; and
   e) removing the core system from the produced fiber composite component.

8. The method as claimed in claim 7, wherein the plurality of core elements prior to step e) are displaced in relation to one another.

9. The method as claimed in claim 7, wherein the plurality of core elements during step c) and/or step d) are displaced in relation to one another.

10. The method as claimed in claim 8, wherein the plurality of core elements during step c) and/or step d) are displaced in relation to one another.

11. The method as claimed in claim 7, wherein at least one core element of the plurality of core elements is heated.

12. The method as claimed in claim 8, wherein at least one core element of the plurality of core elements is heated.

13. The method as claimed in claim 9, wherein at least one core element of the plurality of core elements is heated.

* * * * *